(12) United States Patent
Naitou et al.

(10) Patent No.: US 8,813,905 B2
(45) Date of Patent: Aug. 26, 2014

(54) ROTATING ELECTRICAL MACHINE CONTROL DEVICE AND STEERING CONTROL SYSTEM

(75) Inventors: Akihito Naitou, Ichinomiya (JP); Mikihiro Hiramine, Kariya (JP); Yutaka Ohashi, Handa (JP)

(73) Assignee: Denso Corporation, Kariya (JP)

( * ) Notice: Subject to any disclaimer, the term of this patent is extended or adjusted under 35 U.S.C. 154(b) by 218 days.

(21) Appl. No.: 13/603,779

(22) Filed: Sep. 5, 2012

(65) Prior Publication Data

US 2013/0062138 A1 Mar. 14, 2013

(30) Foreign Application Priority Data

Sep. 8, 2011 (JP) ................................. 2011-196306

(51) Int. Cl.
*B62D 5/02* (2006.01)
*B62D 5/04* (2006.01)
*H02P 5/74* (2006.01)

(52) U.S. Cl.
CPC .. *B62D 5/046* (2013.01); *H02P 5/74* (2013.01)
USPC ........................................................ 180/446

(58) Field of Classification Search
CPC .................................................... B62D 5/0466
USPC ........................................................ 180/446
See application file for complete search history.

(56) References Cited

U.S. PATENT DOCUMENTS

| | | | | |
|---|---|---|---|---|
| 5,402,045 | A * | 3/1995 | Mori | 318/757 |
| 5,811,954 | A * | 9/1998 | Randall | 318/701 |
| 6,559,617 | B2 * | 5/2003 | Kim | 318/701 |
| 6,621,242 | B2 * | 9/2003 | Huang et al. | 318/268 |
| 7,248,016 | B2 * | 7/2007 | Hidaka et al. | 318/811 |
| 7,276,867 | B2 * | 10/2007 | Alberkrack et al. | 318/400.24 |
| 8,076,880 | B2 * | 12/2011 | Hiramine | 318/400.13 |
| 8,179,075 | B2 * | 5/2012 | Maeto et al. | 318/599 |
| 8,508,178 | B2 * | 8/2013 | Norell | 318/701 |

(Continued)

FOREIGN PATENT DOCUMENTS

| | | |
|---|---|---|
| JP | 04-368488 | 12/1992 |
| JP | 09-266693 | 10/1997 |

(Continued)

OTHER PUBLICATIONS

Office Action (3 pages) dated Jul. 12, 2013, issued in corresponding Japanese Application No. 2011-196306 and English trnaslation (4 pages).

*Primary Examiner* — Joseph M Rocca
*Assistant Examiner* — Conan Duda
(74) *Attorney, Agent, or Firm* — Nixon & Vanderhye PC

(57) ABSTRACT

A rotating electrical machine control device includes a target current value calculation section, a PWM signal generation section, a voltage application section, and a control section. The target current value calculation section calculates target current values of electric currents supplied to windings of a rotating electrical machine. The PWM signal generation section generates PWM signals for the respective windings based on the target current values. The voltage application section applies voltages to the respective windings based on the PWM signals. When the control section stops driving of the rotating electrical machine, the PWM signal generation section generates the PWM signals in which a timing of a pulse change in the PWM signal of at least one phase is different from timings of pulse changes in the PWM signals of the other phases.

9 Claims, 5 Drawing Sheets

(56) References Cited

U.S. PATENT DOCUMENTS

| | | | |
|---|---|---|---|
| 8,633,780 B2 * | 1/2014 | Takeuchi | 332/109 |
| 2008/0067960 A1 * | 3/2008 | Maeda et al. | 318/400.02 |
| 2010/0294586 A1 | 11/2010 | Nagase et al. | |
| 2012/0007538 A1 * | 1/2012 | Takeuchi et al. | 318/599 |
| 2012/0158246 A1 | 6/2012 | Takashima | |

FOREIGN PATENT DOCUMENTS

| | | |
|---|---|---|
| JP | 11-29054 | 2/1999 |
| JP | 2008-094342 | 4/2008 |
| JP | 2008-220117 | 9/2008 |
| JP | 2009-1217 | 1/2009 |
| WO | WO 2011/030446 | 3/2011 |

* cited by examiner

ROTATING ELECTRICAL MACHINE CONTROL DEVICE AND STEERING CONTROL SYSTEM

CROSS REFERENCE TO RELATED APPLICATIONS

The present application is based on and claims priority to Japanese Patent Application No. 2011-196306 filed on Sep. 8, 2011, the contents of which are incorporated in their entirety herein by reference.

TECHNICAL FIELD

The present disclosure relates to a rotating electrical machine control device and a steering control system including the rotating electrical machine control device.

BACKGROUND

Conventionally, a steering control system with a rotating electrical machine is used as a driving source of a power steering apparatus of a vehicle. For example, JP-A-2009-1217 discloses an electric power steering apparatus that uses a rotating electrical machine driven by a pulse width modulation (PWM) control as a driving source. The rotating electrical machine is a brushless motor having windings of three phases. The rotating electrical machine is driven by a rotating electrical machine control device including a switching element.

It is general in a rotating electrical machine control apparatus performing a PWM control that when driving of a brushless rotating electrical machine including windings of a plurality of phases is stopped, duty ratios of voltages applied to respective windings are controlled to be 50% and an electric current supplied to the rotating electrical machine is controlled to be zero by applying the voltages to the windings of the respective phase at the same timing. Even when the electric current supplied to the rotating electrical machine is controlled to be zero, an electric current of a common mode (hereafter, referred to as a common mode current) may flow in a spike shape due to a parasitic capacitance of the rotating electrical machine when an application of the voltage is started or stopped. Especially, when the voltages are applied to the windings of the respective phases at the same timing, the common mode currents may overlap each other to be one spike-shaped large current. Accordingly, large electric noise may be output as radio noise and may affect other apparatus.

In the electric power steering apparatus in JP-A-2009-1217, the rotating electrical machine control device includes a filter circuit for reducing the radio noise. As other methods for reducing the radio noise, a snubber circuit or a shielding wire may be added, or a coaxial cable may be used as disclosed in JP-A-11-29054. In the above described methods, because the number of components is large and a configuration is complicated, a cost for reducing the radio noise increases.

SUMMARY

It is an object of the present disclosure to provide a rotating electrical machine control device that can reduce radio noise generated at a time when driving of a rotating electrical machine is stopped. Another object of the present disclosure is to provide a steering control system including the rotating electrical machine control device.

According to a first aspect of the present disclosure, a rotating electrical machine control device includes a target current value calculation section, a PWM signal generation section, a voltage application section, and a control section. The target current value calculation section calculates target current values of electric currents supplied to windings of a rotating electrical machine. The windings respectively correspond to phases of the rotating electrical machine. The PWM signal generation section generates PWM signals having pulse shape for the respective windings based on the target current values calculated by the target current value calculation section. The voltage application section applies voltages to the respective windings based on the PWM signals generated by the PWM signal generation section. The control section controls the target current value calculation section, the PWM signal generation section, and the voltage application section to control driving of the rotating electrical machine. When the control section stops the driving of the rotating electrical machine, the control section controls the PWM signal generation section to generate the PWM signals in which a timing of a pulse change in the PWM signal of at least one of the phases is different from timings of pulse changes in the PWM signals of the other phases.

The rotating electrical machine control device can reduce radio noise generated from the rotating electrical machine control device or the rotating electrical machine at a time when the rotating electrical machine control device stops driving of the rotating electrical machine.

According to a second aspect of the present disclosure, a steering control system includes the rotating electrical machine control device according to the first aspect and the rotating electrical machine attached to a member that controls a direction of a main controlled wheel of a vehicle.

According to a third aspect of the present disclosure, a steering control system includes the rotating electrical machine control device according to the first aspect and the rotating electrical machine attached to a member that controls a direction of a sub-controlled wheel of a vehicle that is different from a main controlled wheel.

According to a fourth aspect of the present disclosure, a steering control system includes the rotating electrical machine control device according to the first aspect and the rotating electrical machine including a first rotating electrical machine and a second rotating electrical machine. The first rotating electrical machine is attached to a member that controls a direction of a main controlled wheel of a vehicle. The second rotating electrical machine is attached to a member that controls a direction a sub-controlled wheel that is different from the main controlled wheel.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

First Embodiment

Figure 1:
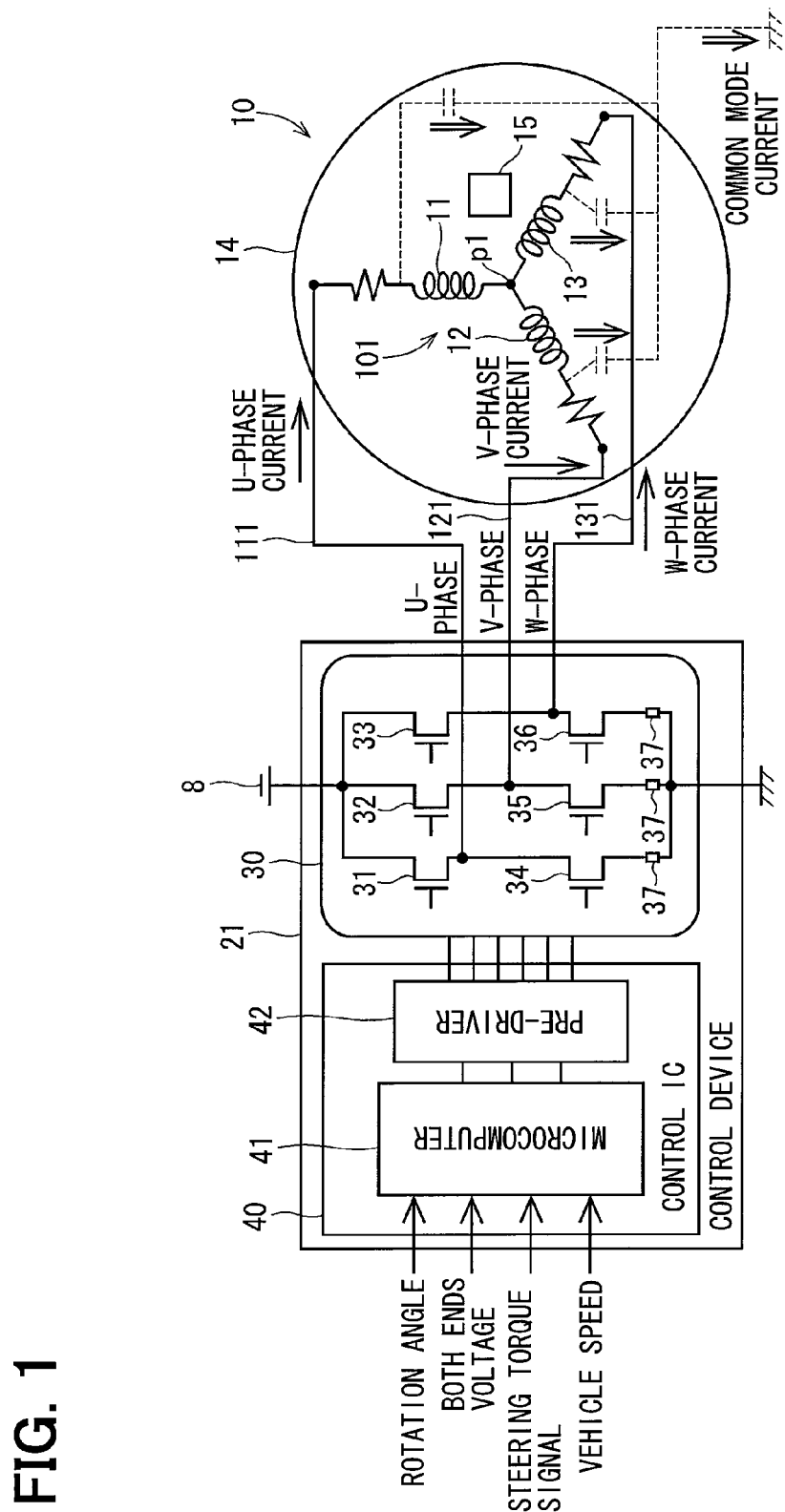
FIG. 1 a diagram showing a rotating electrical machine control device according to a first embodiment of the present disclosure.
Figure 2:
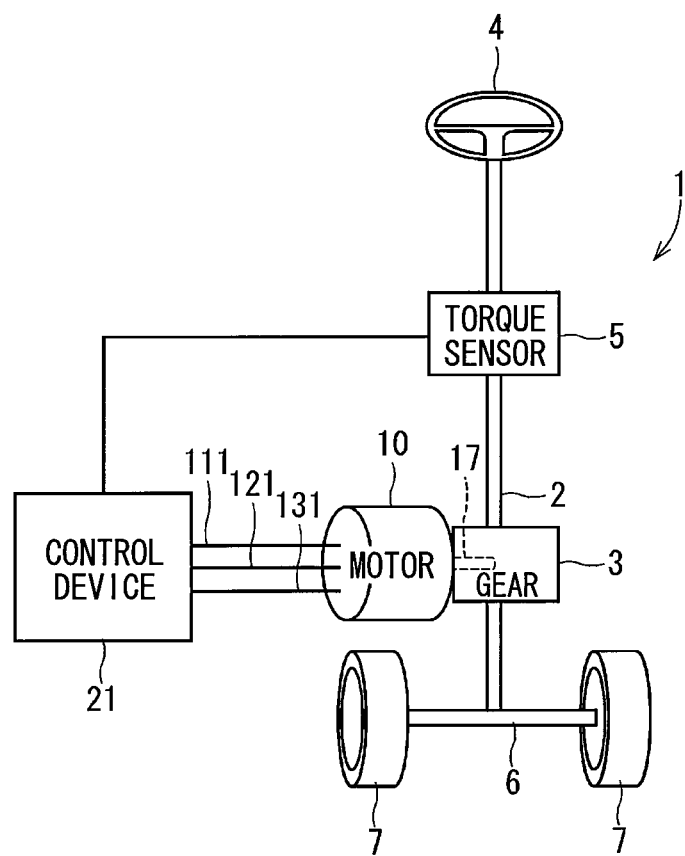
FIG. 2 is a diagram showing an electric power steering apparatus including the rotating electrical machine control device according to the first embodiment.

A rotating electrical machine control device (CONTROL DEVICE) 21 according to a first embodiment of the present disclosure will be described with reference to the accompanying drawings. As shown in FIG. 1, the rotating electrical machine control device 21 can be used for controlling driving of a motor 10 as a rotating electrical machine. As shown in FIG. 2, the motor 10 is used as a driving force of an electric power steering apparatus 1 disposed in a vehicle. In other words, the rotating electrical machine control device 21 and the motor 10 are components of the electric power steering apparatus 1.

The electric power steering apparatus 1 includes a column shaft 2, a gear 3, a steering wheel 4, a torque sensor 5, a rack 6, and front wheels 7. The column shaft 2 is attached with a gear 3. In addition, one end portion of the column shaft 2 is attached with the steering wheel 4. The torque sensor 5 is attached to a position of the column shaft 2 between the gear 3 and the steering wheel 4. At the other end portion of the column shaft 2 opposite from the steering wheel 4, a pinion gear is disposed. The pinion gear engages with a gear of the rack 6. Two ends of the rack 6 are respectively coupled with the front wheels 7 as main controlled wheels. When a driver of the vehicle rotates the steering wheel 4, a steering torque is transferred to the column shaft 2, the rack 6 moves in a longitudinal direction, and directions of the front wheels 7 are changed. In other words, the column shaft 2 is one of members that control the directions of the front wheels 7.

The motor 10 is attached in such a manner that an end portion of a motor shaft 17 engages with the gear 3 attached to the column shaft 2. The rotating electrical machine control device 21 generates a steering assistance force by rotating the motor 10 forward and reverse based on, for example, a torque signal transmitted from a torque sensor 5 for detecting a steering torque of the steering wheel 4 and a vehicle speed signal acquired from a controller area network (CAN) which is not shown.

As shown in FIG. 1, the motor 10 includes windings 11, 12, 13. In the present embodiment, the motor 10 is a general three-phase brushless motor. The windings 11, 12, 13 are wound to a stator (not shown) which is housed and fixed in a motor case 14 and form one winding group 101. Inside the stator, a rotator (not shown) is disposed so as to be rotatable with respect to the stator. The motor shaft 17 is disposed at a rotation center of the rotor. The motor shaft 17 is rotatably held by the motor case 14. In other words, the rotor is rotatably held by the motor case 14 through the motor shaft 17.

The windings 11, 12, 13 are in Y-connection. The windings 11, 12, 13 respectively correspond to a U-phase, a V-phase, and a W-phase of the motor 10. A connection point of the windings 11, 12, 13 is a neutral point p1. The rotating electrical machine control device 21 controls electric power supplied to the windings 11, 12, 13 to drive the motor 10. The motor 10 includes a rotation angle sensor 15 that detects a rotation angle of the rotor with respect to the stator. The rotating electrical machine control device 21 includes an inverter 30 and a control integrated circuit (control IC) 40.

The inverter 30 includes switching elements 31-36. In the present embodiment, each of the switching elements 31-36 is a metal-oxide-semiconductor field-effect transistor (MOSFET) that is one of field effect transistors. A source and a drain of each of the switching elements 31-36 are coupled and decoupled (on and off) by controlling a gate voltage.

The drains of the switching elements 31-33 located on an upper arm side are coupled with a power source 8 and the sources of the switching elements 31-33 are coupled with the drains of the corresponding switching elements 34-36 located on a lower arm side. The sources of the switching elements 34 located on the lower arm side are coupled with the ground. Connection points of the switching elements 31-33 located on the upper arm side and the switching elements 34-36 located on the lower arm side are electrically coupled with the windings 11, 12, 13 of the motor 10 via motor wires 111, 121, 131, respectively. A pair of switching elements including the switching element 31 and the switching element 34 corresponds to the U-phase. A pair of switching elements including the switching element 32 and the switching element 35 corresponds to the V-phase. A pair of switching elements including the switching element 33 and the switching element 36 corresponds to the W-phase. Between the switching elements 34-36 and the ground, shunt resistors 37 are respectively disposed. By detecting a voltage applied to both ends of each of the shunt resistors 37 (hereafter, referred to as a both ends voltage), the electric current supplied to each phase of the motor 10 can be detected.

The control IC 40 is a semiconductor integrated circuit including a microcomputer 41 and a pre-driver 42. The microcomputer 41 includes a central processing unit (CPU), a read-only memory (ROM), and a random access memory (RAM). The CPU can operate as a calculation section. The ROM and RAM can operate as a storing section. In the microcomputer 41, the CPU executes various processes based on various programs stored in the ROM. The microcomputer 41 can operate as control section.

The microcomputer 41 receives the signal relating to the rotation angle of the motor 10 from the rotation angle sensor 15, information relating to the both ends voltages of the shunt resistors 37, the steering torque signal from the torque sensor 5, and the vehicle speed information from the CAN. When the microcomputer 41 receives the above-described signals, the microcomputer 41 controls the switching elements 31-36 via the pre-driver 42 based on the rotation angle of the motor 10. The microcomputer 41 controls on-off states of the switching elements 31-36 by changing the gate voltages of the switching elements 31-36 using the pre-driver 42. Furthermore, the microcomputer 41 controls the switching elements 31-36 so that the electric current supplied to the motor 10 becomes a sine wave based on the both ends voltages of the shunt resistors 37.

An operation of the rotating electrical machine control device 21 will be described below. Based on the information from the rotation angle sensor 15, the torque sensor 5, the shunt resistors 37, and the CAN, the microcomputer 41 calculates target current values relating to q-axis currents supplied to the windings 11, 12, 13 so that the motor 10 outputs a torque to assist a steering operation of the steering wheel 4. The microcomputer 41 can also operate as a target current value calculation section.

The microcomputer 41 generates pulse-shaped PWM signals for the respective phases (i.e., the windings 11, 12, 13) based on the target current values and transmits the PWM signals to the pre-driver 42. The microcomputer 41 can also operate as a PWM signal generation section.

The pre-driver 42 generates pulse signals based on the PWM signals transmitted from the microcomputer 41. The pre-driver 42 transmits the pulse signals to the inverter 30 including the switching elements 31-36 to control the on-off states of the switching elements 31-36. By controlling the on-off states of the switching elements 31-36, a voltage of the power source 8 is applied to the windings 11, 12, 13. The pre-driver 42 and the inverter 30 can operate as a voltage application section.

When the voltage of the power source 8 is applied to the windings 11, 12, 13, sine wave currents having different phases flow to the windings 11, 12, 13 of the motor 10, and a rotating magnetic field is generated. By receiving the rotating magnetic field, the rotor and the motor shaft 17 integrally rotate. When the motor shaft 17 rotates, a driving force is transferred to the gear 3 of the column shaft 2, and the steering operation of a driver with the steering wheel 4 is assisted.

Next, an operation of the rotating electrical machine control device 21 for stopping the driving of the motor 10 will be described with reference to FIG. 3. When the microcomputer 41 executes a control for stopping the driving of the motor 10, the microcomputer 41 firstly operate as the target current value calculation section. The microcomputer 41 calculates the target current values so that the target current values of the electric currents flowing to the windings 11, 12, 13 become predetermined values other than zero. The predetermined values other than zero are small values not affecting the driving of the motor 10. In other words, the electric currents of the predetermined values are small currents not contributing to an output torque of the motor 10.

Figure 3A:
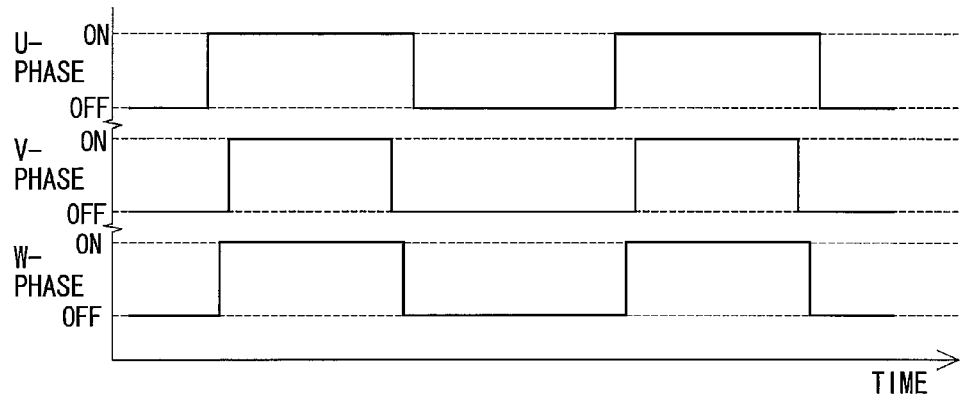
FIG. 3A is a diagram showing waveforms of PWM signals generated by the rotating electrical machine control device according to the first embodiment at a time when the rotating electrical machine control device stops driving of a rotating electrical machine.
Figure 3B:
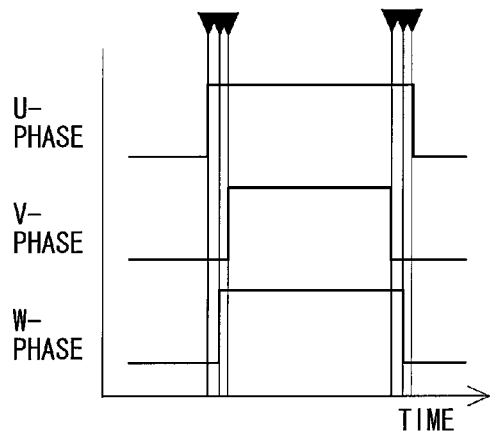
FIG. 3B is a diagram showing a part of the PWM signals shown in FIG. 3A.

Next, the microcomputer 41 operate as the PWM signal generation section and generates the PWM signals for the respective phases based on the target current values of the respective phases. Because the target current values for the respective phases are the predetermined values other than zero, the PWM signals generated by the microcomputer 41 have shapes shown in FIG. 3A. As shown in FIG. 3B, timings of a rising edge and a falling edge of the PWM signal of each phase are different from timings of rising edges and falling edges of the PWM signals of the other phases. Duty ratios of the PWM signals are about 50%.

When the PWM signals shown in FIG. 3B are transmitted from the microcomputer 41 to the pre-driver 42, the on-off states of the switching elements 31-36 in the inverter 30 are controlled. Accordingly, the voltage is applied to each of the windings 11, 12, 13 at the rising edge of each of the PWM signals. When the voltages are applied to the windings 11, 12, 13 at the same timing or when the applications of the voltages to the windings 11, 12, 13 are stopped at the same timing, common mode currents respectively flow to the windings 11, 12, 13 at timings when the voltages are applied (i.e., the rising edges of the PWM signals) or at timings when the applications of the voltages is stopped (i.e., the falling edges of the PWM signals) as shown in FIG. 1, due to parasitic capacitances of a coil component and a resistor component of the motor 10. The common mode currents have spike shapes.

Figure 3C:
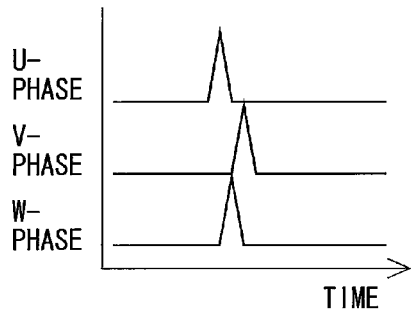
FIG. 3C is a diagram showing waveforms of common mode currents flowing to respective phases of the rotating electrical machine.
Figure 3D:
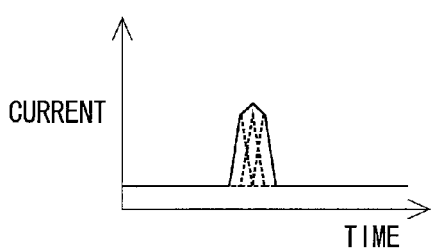
FIG. 3D is a diagram showing a waveform of a common mode current flowing to the rotating electrical machine.

As shown in FIG. 3C, the spike-shaped common mode currents flow to the windings 11, 12, 13 at timings when the voltages are applied (i.e., at the rising edges of the PWM signals). Because the timings of the rising edges of the PWM signals are shifted from each other, the timings when the common mode currents of the respective phases flow are shifted from each other. Accordingly, the sum of the common mode currents flowing to the motor 10 can be small as shown in FIG. 3D. As a result, generated radio noise can be small.

Also at the timings when the application of the voltages are stopped (i.e., at the falling edges of the PWM signals), the spike-shaped common mode currents flow to the windings 11, 12, 13. Because the timings of the falling edges of the PWM signals are shifted from each other, the timings when the common mode currents of the respective phases flow are shifted from each other. Accordingly, the sum of the common mode currents flowing to the motor 10 can be small.

As described above, in the present embodiment, when driving of the motor 10 is stopped, the target current values of the electric currents supplied to the windings of the respective phases are calculated to be the predetermined values other than zero. Accordingly, the timings of pulse change in the PWM signals of the respective phases are different from each other. Thus, the inverter 30 starts to apply the voltages to the windings of the respective phases at different timings from each other. As a result, the timings when the common mode currents of the respective phases shift in time from each other, and the sum of the common mode currents flowing to the motor 10 can be small. Accordingly, radio noise generated at a time when the driving of the motor 10 stops can be reduced.

Next, an operation of a rotating electrical machine control device according to a comparative example will be described. The rotating electrical machine control device according to the comparative example has a similar physical configuration to the rotating electrical machine control device 21 according to the present embodiment. In the comparative example, the microcomputer 41 calculates target current values of electric currents flowing to the windings 11, 12, 13 to be zero when the microcomputer 41 stops driving of the motor 10.

Figure 4A:
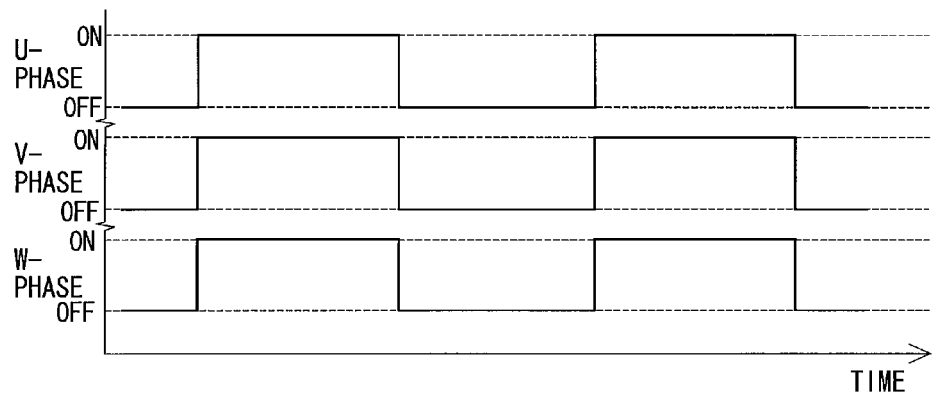
FIG. 4A is a diagram showing waveforms of PWM signals generated by a rotating electrical machine control device according to a comparative example at a time when the rotating electrical machine control device stops driving of a rotating electrical machine.
Figure 4B:
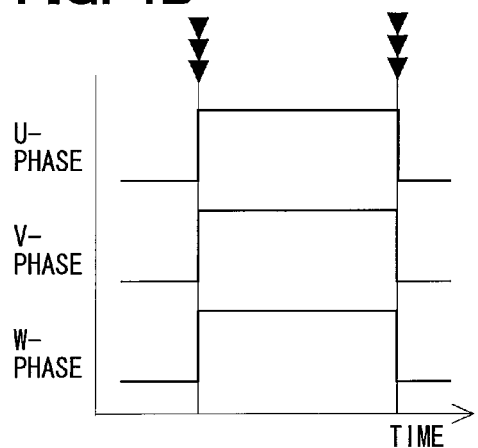
FIG. 4B is a diagram showing a part of the PWM signals shown in FIG. 4A.

Then, the microcomputer 41 generates the PWM signals for the respective phases based on the target current values calculated for the respective phases. Because the target current values for the respective phases are zero, the PWM signals generated by the microcomputer 41 have shapes as shown in FIG. 4A. As shown in FIG. 4B, the microcomputer 41 generates the PWM signals so that timings of rising edges of the PWM signals of the all phases are same as each other and timings of falling edges of the PWM signals of the all phases are same as each other. Duty ratios of the PWM signals are 50%. In other words, the control method according to the comparative example is same as a conventional control method for stopping a driving of a three-phase brushless motor.

When the PWM signals shown in FIG. 4B are transmitted from the microcomputer 41 to the pre-driver 42, the on-off states of the switching elements 31-36 of the inverter 30 are controlled. Accordingly, at the timings of the rising edges of the PWM signals, the voltages are applied to the windings 11, 12, 13. At this time, spike-shaped common mode currents flow to the windings 11, 12, 13 at timings when the voltages are applied (i.e., at the timings of the rising edges of the PWM signals) and at timings when the application of the voltages are stopped (i.e., at the timings of the falling edges of the PWM signals).

Figure 4C:
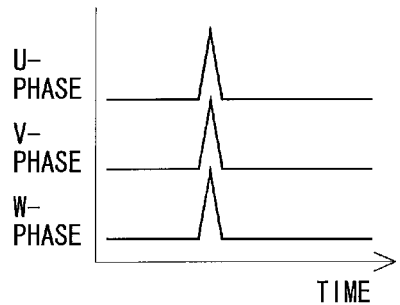
FIG. 4C is a diagram showing waveforms of common mode currents flowing to respective phases of the rotating electrical machine.
Figure 4D:
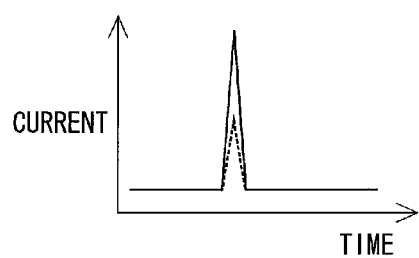
FIG. 4D is a diagram showing a waveform of a common mode current flowing to the rotating electrical machine.

As shown in FIG. 4C, the spike-shaped common mode currents flow to the windings 11, 12, 13 at the timings when the voltages are applied (i.e., at the timings of the rising edges of the PWM signals. In the comparative example, the timings of the rising edges of the PWM signals are same as each other. Thus, the common mode currents of the respective phases flow at the same timings. As a result, the sum of the common mode currents flowing to the motor 10 becomes large as shown in FIG. 4D, and generated radio noise may be large.

Also at the timings when the application of the voltages are stopped (i.e., at the timings of the falling edges of the PWM signals), the spike-shaped common mode currents flow to the windings 11, 12, 13. In the comparative example, the timings of the falling edges of the PWM signals are same as each other. Thus, the common mode currents of the respective phases flow at the same timings. Accordingly, the sum of the common mode current flowing to the motor 10 becomes large.

As described above, in the present embodiment, when driving of the motor 10 is stopped, the timings of applying the voltages to the windings 11, 12, 13 are controlled to be different from each other so as to reduce radio noise compared with the comparative example.

Next, the following describes a control method in cases where an abnormality, such as breaking of wire, occurs in the rotating electrical machine control device 21 or one phase in the motor 10, that is, an abnormal time control method. For example, in cases where an abnormality, such as an off failure, occurs in the switching element 31 or the switching element 34 of the inverter 30 corresponding to the U-phase, or when an abnormality, such as, breaking of wire, occurs in the winding 11 corresponding to the U-phase, the rotating electrical machine control device 21 continues the driving of the motor 10 using the other two phases (i.e., the V-phase and the W-phase). In the other words, the motor 10 is driven in a two-phase driving mode.

As described above, in cases where driving of the motor 10 is stopped when the motor 10 is driven in the two-phase driving mode (abnormal time control), the target current values of the electric currents supplied to the windings 12, 13 of the driving phases (i.e., the V-phase and the W-phase) are calculated to be predetermined values other than zero. Then, the microcomputer 41 operate as the PWM signal generation section and generates the PWM signals for the respective phases based on the target current values for the respective phases. Because the target current values for the respective phases are values other than zero, timings of rising edges are different from each other and timings of the falling edges are different from each other. The duty ratios of the PWM signals are about 50%.

When the PWM signals are transmitted from the microcomputer 41 to the pre-driver 42, the on-off states of the switching elements 32, 33, 35, 36 of the inverter 30 are controlled. Accordingly, the voltages are applied to the windings 12, 13 at the timings of the rising edges of the PWM signals. When the voltage are applied to the windings 12, 13 at the same timing or when the applications of the voltages to windings 12, 13 are stopped at the same timing, common mode currents respectively flow to the windings 11, 12, 13 at times when the voltages are applied (i.e., the rising edges of the PWM signals) and at times when the applications of the voltages is stopped, due to the parasitic capacitances of the coil component and the resistor component of the motor 10. The common mode currents have spike shapes.

The spike-shaped common mode currents flow to the windings 12, 13 at timings when the voltages are applied (i.e., at the timings of the rising edges of the PWM signals) and at timings when the application of the voltages are stopped (i.e., at the timings of the falling edges of the PWM signals). Because the timings of the rising edges of the PWM signals are shifted from each other and timings of the falling edges of the PWM signals are shifted from each other, the timing when the common mode currents of the respective phases flow are shifted from each other. Accordingly, the sum of the common mode currents flowing to the motor 10 can be small. As a result, a generated radio noise can be small.

As described above, in the present embodiment, for example, in cases where an abnormality occurs in a component corresponding to the U-phase, driving of the motor 10 is continued using the other two phases (i.e., the V-phase and the W-phase) as the driving phases. When the driving of the motor 10 is stopped, the target current values of the electric currents supplied to the driving phases (i.e., the V-phase and the W-phase) are calculated to be the predetermined values other than zero. Accordingly, the microcomputer 41 generates the PWM signals in which the timings of pulse changes in the PWM signal of one phase are different from timings of pulse changes in the PWM signal of the other phase. Accordingly, the inverter 30 applies the voltages in such a manner that the timing of applying the voltage to the winding of one phase is different from the timing of applying the voltage to the winding of the other phase. As a result, the timing when the common mode currents of the respective phases flow are shifted in time from each other, and the sum of the common mode currents flowing to the motor 10 can be small. Thus, also during the abnormal time control, the radio noise generated at driving or stopping the motor 10 can be reduced.

As described above, in the present embodiment, when the microcomputer 41 stops driving of the motor 10, the microcomputer 41 generates the PWM signals in which the timing of the pulse change in the PWM signal of each phase is different from the timings of the pulse changes in the PWM signals of the other phases. Accordingly, the timings of the rising edge and the falling edge of the PWM signal of each phase can be shifted from the timings of the rising edges and the falling edges of the PWM signal of the other phases. As a result, the pre-driver 42 and the inverter 30 can apply the voltages to the windings 11, 12, 13 of the respective phases at different timings with certainty. Thus, radio noise generated from the rotating electrical machine control device 21 or the motor 10 at a time when the motor 10 is driven or when the motor 10 is stopped can be reduced with certainty.

In the present embodiment, the rotating electrical machine control device 21 and the motor 10 are included in the electric power steering apparatus 1 as the steering control system disposed in the vehicle. In the present embodiment, radio noise generated from the rotating electrical machine control device 21 or the motor 10 at the time when the motor 10 is driven or when the motor 10 is stopped can be reduced. Thus, noise due to the radio noise is less likely to be output from a radio equipped in the vehicle.

Furthermore, in the present embodiment, in cases where an abnormality occurs in one phase, the rotating electrical machine control device 21 executes the abnormal time control in which the driving of the motor 10 is continued using the other driving phases. When the motor 10 is stopped during the abnormal time control, the target current values of the electric currents supplied to the driving phases are calculated to be the predetermined values other than zero. Accordingly, the timings of applying the voltages to the windings of the driving phase do not overlap each other. Thus, also during the abnormal time control, radio noise generated at the time when the motor 10 is driven or when the motor 10 is stopped can be reduced.

Second Embodiment

Figure 5:
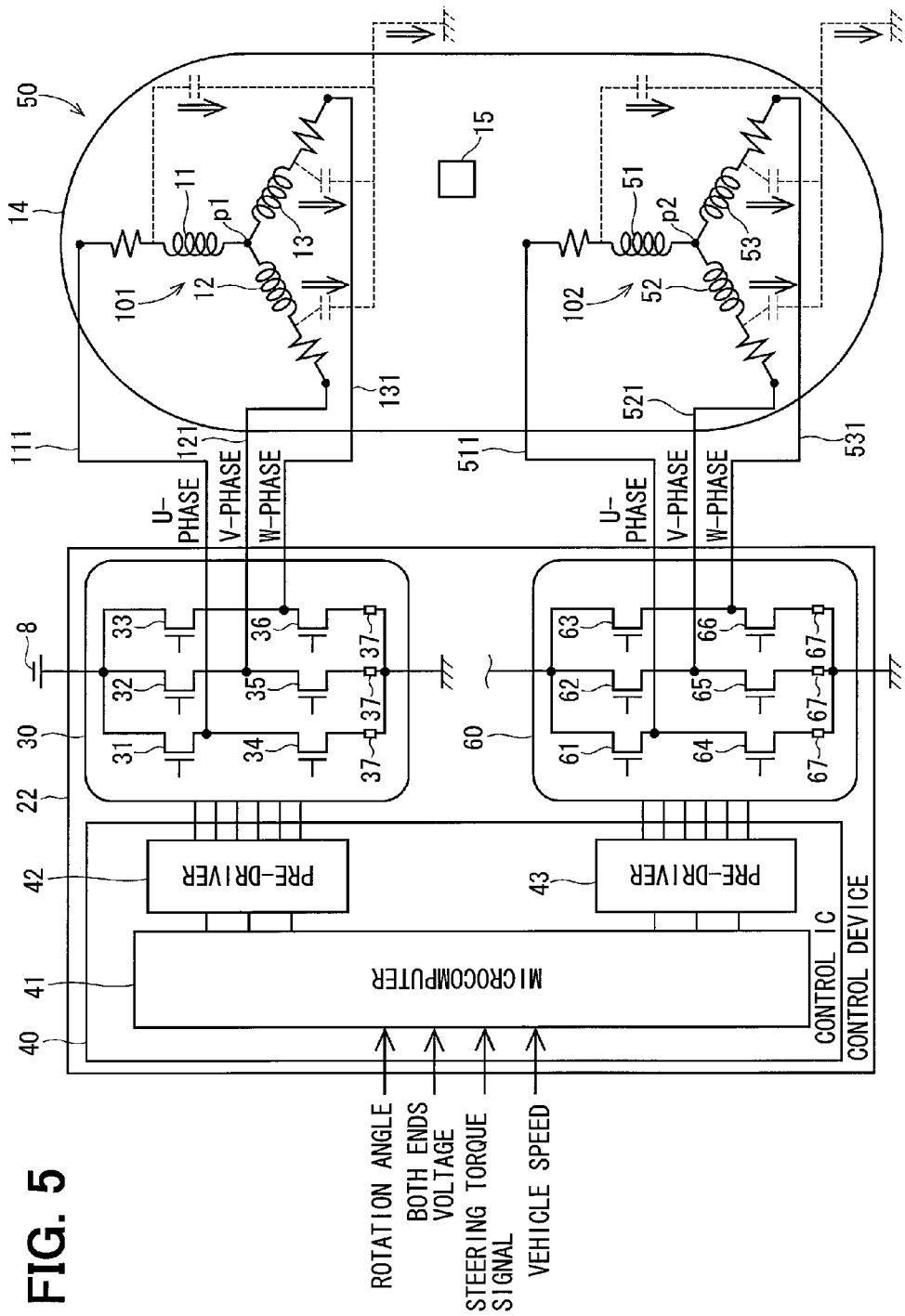
FIG. 5 is a diagram showing a rotating electrical machine control device according to a second embodiment of the present disclosure.

A rotating electrical machine control device 22 according to a second embodiment of the present disclosure will be described with reference to FIG. 5. The rotating electrical machine control device 22 controls a motor 50 including two winding groups.

The motor 50 includes a first winding group 101 and a second winding group 102. The first winding group 101 includes windings 11, 12, 13. The second winding group 102 includes windings 51, 52, 53. The windings 51, 52, 53 are wound to a stator fixed in the motor case 14 in a manner similar to the first winding group 101. The windings 51, 52, 53, are in Y-connection. The windings 51, 52, 53 respectively correspond to a U-phase, a V-phase, and a W-phase of the motor 50. The windings 51, 52, 53 are coupled with each other at a neutral point p2.

The rotating electrical machine control device 22 rotates the motor 50 by controlling electric power supplied to the first winding group 101 (i.e., the windings 11, 12, 13) and the second winding groups (i.e., the windings 51, 52, 53). Although the first winding group 101 and the second winding group 102 are separately illustrated in FIG. 5 for convenience, the first winding group 101 and the second winding group 102 are wound to the same one stator. In other words, the motor 50 includes two winding systems to form a redundant system.

The rotating electrical machine control device 22 includes an inverter 60 and a pre-driver 43 in addition to the inverter 30 and the pre-driver 42. The inverter 60 includes switching elements 61-66. In the present embodiment, the switching elements 61-66 are MOSFETs in a manner similar to the switching elements 31-36.

Connection configurations of the switching elements 61-66 are similar to the connection configurations of the switching elements 31-36. Connection points of the switching elements 61-63 located on the upper arm side and the switching elements 64-66 located on the lower arm side are electrically coupled with the windings 51, 52, 53 of the motor 50 via motor wires 511, 521, 531, respectively. A pair of switching elements including the switching element 61 and the switching element 64 corresponds to the U-phase. A pair of switching elements including the switching element 62 and the switching element 65 corresponds to the V-phase. A pair of switching elements including the switching element 63 and the switching element 66 corresponds to the W-phase.

Between the switching elements 64-66 and the ground, shunt resistors 67 are respectively disposed. By detecting a voltage applied to both ends of each of the shunt resistors 67 (hereafter, referred to as a both ends voltage), the electric current flowing to each phase of the second winding group of the motor 50 can be detected.

The microcomputer 41 receives the signal relating to the rotation angle of the motor 50 from the rotation angle sensor 15, information relating to the both ends voltages of the shunt resistors 37, 67, the steering torque signal from the torque sensor 5, and the vehicle speed information from the CAN. When the microcomputer 41 receives the signals, the microcomputer 41 controls the switching elements 31-36 via the pre-driver 42 and controls the switching elements 61-66 via the pre-driver 43 based on the rotation angle of the motor 50.

In the present embodiment, the windings 11, 12, 13, the inverter 30, and the pre-driver 42 form a first system, and the windings 51, 52, 53, the inverter 60, and the pre-driver 43 form a second system. The first system and the second system are electrically separated. Thus, even when an electric abnormality occurs in one system, the motor 50 can be driven by the other system.

Next, an operation of the rotating electrical machine control device 22 will be described below. Based on the information from the rotation angle sensor 15, the torque sensor 5, the shunt resistors 37, 67, and the CAN, the microcomputer 41 calculates target current values relating to q-axis currents supplied to the windings 11, 12, 13, 51, 52, 53 so that the motor 50 outputs a torque to assist a steering operation of the steering wheel 4 based on the vehicle speed of the motor 10. The microcomputer 41 can operate as a target current value calculation section.

The microcomputer 41 generates PWM signals having pulse shape for the respective phases (i.e., the windings 11, 12, 13, 51, 52, 53) based on the target current values and transmits the PWM signals to the pre-drivers 42, 43. The microcomputer 41 can also operate as a PWM signal generation section.

The pre-drivers 42, 43 generate pulse signals based on the PWM signals transmitted from the microcomputer 41. The pulse signals are transmitted to the inverter 30 including the switching elements 31-36 and the inverter 60 including the switching elements 61-66 to control on-off states of the switching elements 31-36 and the switching elements 61-66. By switching the on-off states of the switching elements 31-36 and the switching elements 61-66, the voltage of the power source 8 is applied to each of the windings 11, 12, 13, 51, 52, 53. The pre-drivers 42, 43 and the inverters 30, 60 can operate as voltage application sections.

When the voltage of the power source 8 is applied to each of the windings 11, 12, 13, 51, 52, 53, sine wave currents having different phases flow to the windings 11, 12, 13, 51, 52, 53 of the motor 50, and a rotating magnetic field is generated. By receiving the rotating magnetic field, the rotor and the motor shaft 17 integrally rotate. When the motor shift 17 rotates, a driving force is transferred to the gear 3 of the column shaft 2, and the steering operation of a driver with the steering wheel 4 is assisted.

Next, an operation of the rotating electrical machine control device 22 for stopping driving of the motor 50 will be described with reference to FIG. 3. When the microcomputer 41 executes a control for stopping the driving of the motor 50, the microcomputer 41 firstly operate as the target current value calculation section. The microcomputer 41 calculates the target current values so that all the target current values of the electric currents supplied to the windings 11, 12, 13, 51, 52, 53 become predetermined values other than zero. The predetermined values other than zero are small values that do not affect the driving of the motor 50. In other words, the electric current of the predetermined values are small currents that do not contribute to the output torque of the motor 50.

Then, the microcomputer 41 operate as the PWM signal generation section and generates the PWM signals for the respective phases based on the target current values for the respective phases. Because the target current values for the respective phases are values other than zero, the timings of rinsing edges are different from each other and timings of the falling edges are different from each other. The duty ratios of the PWM signals are about 50%.

When the PWM signals are transmitted from the microcomputer 41 to the pre-drivers 42, 43, the on-off states of the switching elements 31-36, 61-66 of the inverters 30, 60 are controlled. Accordingly, at the timings of the rising edges of the PWM signals, the voltages are applied to the windings 11, 12, 13, 51, 52, 53. When the voltage are applied to the windings 11, 12, 13, 51, 52, 53 at substantially the same time, common mode currents respectively flow to the windings 11, 12, 13, 51, 52, 53 at timings when the voltages are applied (i.e., the rising edges of the PWM signals) and at timings when the applications of the voltages are stopped (i.e., the falling edges of the PWM signals) as shown in FIG. 5. The common mode currents have spike shapes.

The spike-shaped common mode currents flow to the windings 11, 12, 13, 51, 52, 53 at timings when the voltages are applied (i.e., at the timings of the rising edges of the PWM signals) and at timings when the application of the voltages are stopped (i.e., at the timings of the falling edges of the PWM signals). Because the timings of the rising edges of the PWM signals are shifted from each other and the timings of the falling edges of the PWM signals are shifted from each other, the timings when the common mode currents of the respective phases flow are shifted from each other. Accordingly, the sum of the common mode currents flowing to the motor 50 can be small. As a result, generated radio noise can be small.

As described above, in the present embodiment, when driving of the motor 50 is stopped, the target current values of the electric currents supplied to the windings of the respective phases of each system are calculated to be the predetermined values other than zero. Accordingly, the timings of pulse change in the PWM signals of the respective phases are different from each other. Thus, the inverters 30, 60 start to apply the voltages to the windings of the respective phases at different timings from each other. As a result, the timings when the common mode currents of the respective phases flow are shifted in time from each other and the sum of the common mode currents flowing to the motor 50 can be small. Accordingly, the radio noise generated at the time when the driving of the motor 50 stops can be reduced.

Third Embodiment

A rotating electrical machine control device according to a third embodiment of the present disclosure will be described. Although a physical configuration of the rotating electrical machine control device according to the present embodiment is similar to the physical configuration of the rotating electrical machine control device 22 according to the second embodiment, an operation for stopping driving of the motor 50 is different from the second embodiment. In the motor 50 driven by the rotating electrical machine control device according to the present embodiment, a physical constant of the first winding group 101 is set to be equal to a physical constant of the second winding group 102. When the sum of q-axis currents flowing to the two systems becomes greater than or equal to 5 A due to, for example, a mechanical loss, the motor 50 starts to drive by a generated torque. The physical constant of the two winding groups are set to be equal to each other for ease of explanation. Actually, the physical constants of the two winding groups may be different from each other.

In the present embodiment, when the microcomputer 41 stops driving of the motor 50, the microcomputer 41 firstly functions as a target current value calculation section. The microcomputer 41 calculates a target current value of electric current supplied to the first winding group 101 (i.e., the windings 11, 12, 13) to be 6 A as the q-axis current and calculates a target current value of electric current supplied to the second winding group 102 (i.e., the windings 51, 52, 53) to be −3 A as the q-axis current. In this way, the absolute value of the target current value of the electric current supplied to the first winding group 101 and the absolute value of the target current value of the electric current supplied to the second winding group 102 are different from each other.

Then, the microcomputer 41 operate as the PWM signal generation section and generates the PWM signals for the respective phases based on the target current values for the respective phases. Because the target current values for the respective phases are large values other than zero, the timings of rinsing edges are greatly different from each other and timings of the falling edges are greatly different from each other. The duty ratios of the PWM signals are greatly different from 50%.

When the PWM signals are transmitted from the microcomputer 41 to the pre-drivers 42, 43, the on-off states of the switching elements 31-36, 61-66 of the inverters 30, 60 are controlled. Accordingly, at the timings of the rising edges of the PWM signals, the voltages are applied to the windings 11, 12, 13, 51, 52, 53.

Because the target current value of the electric current supplied to the first winding group 101 are calculated to be 6 A as the q-axis current, the electric current of 6 A as the q-axis current flows to the first winding group 101. On the other hand, the target current value of the electric current supplied to the second winding group 102 are calculated to be −3 A as the q-axis current, the electric current of −3 A as the q-axis current flows to the second winding group 102. Thus, substantially, the electric current of 3 A flows to the motor 50 and does not exceed a lower limit of electric current for generating a torque. Thus, a torque is not generated, and a rotation of the motor 50 stops.

The spike-shaped common mode currents flow to the windings 11, 12, 13, 51, 52, 53 at timings when the voltages are applied (i.e., at the timings of the rising edges of the PWM signals) and at timings when the application of the voltages are stopped (i.e., at the timings of the falling edges of the PWM signals). Because the timings of the rising edges of the PWM signals are greatly shifter from each other and the timings of the falling edges of the PWM signals are greatly shifted from each other, the timings when the common mode currents of the respective phases flow are greatly shifted from each other. Accordingly, the sum of the common mode currents flowing to the motor 50 can be small. Thus, generated radio noise can be small.

Other Embodiments

In the above-described embodiment, the three windings in one winding group are in Y-connection. In another embodiment, three windings may be in delta connection. In another embodiment, one winding group may include two or more than three windings.

In the first embodiment, the rotating electrical machine including the one winding group is a control object. In the second embodiment and the third embodiment, the rotating electrical machine including the two winding groups is a control object. In another embodiment, a rotating electrical machine including more than two winding groups may be a control object. In this case, a rotating electrical machine control device may include more than two pairs of pre-driver and inverter so as to correspond to the number of systems of the rotating electrical machine.

In the above-described embodiments, when the control section stops driving of the rotating electrical machine, the control section controls the target current value calculation section to calculate the target current values of the electric currents supplied to the windings of the respective phases to be the predetermined values other than zero. Accordingly, the control section controls the PWM signal generation section to generate the PWM signals in which the timing of the pulse change in the PWM signal of each of the phases is different from the timings of the pulse changes in the PWM signals of the other phases. In another embodiment, when the control section stops driving of the rotating electrical machine, the control section may control the target current value calculation section to calculate the target current value of the electric current supplied to at least one of the phases to be a predetermined value other zero, and the control section may control the PWM signal generation section to generate the PWM signals in which the timing of the pulse change in the PWM signal of the one of the phases is different from the timings of the pulse changes in the PWM signals of the other phases.

In the above-described embodiments, when the control section stops driving of the rotating electrical machine, the PWM signal generation section generates the PWM signals in which the timings of the rising edges of the PWM signals are different from each other and the timings of the falling edges of the PWM signals are different from each other. In another embodiment, the PWM signal generation section generates the PWM signals in which the timings of the rising edges of the PWM signals are different from each other or the timings of the falling edges of the PWM signals are different from each other.

In another embodiment, when the control section stops driving of the rotating electrical machine, the target current value calculation section may calculate the target current values to be zero, and the control section may directly control the PWM signal generation section to generate the PWM signals in which the timing of the pulse change in the PWM signal of at least one phase is different from the timings of the pulse changes in the PWM signals of the other phases.

In another embodiment, when the control section stops driving of the rotating electrical machine, the target current value calculation section may calculate the target current values to be zero, and the control section may directly control the voltage application section to apply voltage in such a manner that the timing of applying the voltage to the winding of at least one phase is different from the timings of applying the voltages to the windings of the other phases.

In the above-described embodiments, the rotating electrical machine is attached to a member that controls a direction of the main controlled wheel of the vehicle and the rotating electrical machine is controlled by the rotating electrical machine control device. In other words, the rotating electrical machine control device is applied to the electric power steering apparatus as a steering control system. In another embodiment, the rotating electrical machine may be attached to a member that controls a direction of a sub-controlled wheel of the vehicle that is different from the main controlled wheel, and the rotating electrical machine may be controlled by the rotating electrical machine control device. In general, the main controlled wheel of the vehicle corresponds to the front wheel. Thus, in this embodiment, the rotating electrical machine may be attached to a member that controls a direction of a rear wheel. In other words, in this embodiment, the rotating electrical machine control device and the rotating electrical machine may be included in a rear wheel steering apparatus as a steering control system (active control system) in a 4 wheel steering vehicle. Also in the present embodiment, the rotating electrical machine control device can reduce radio noise generated at a time when driving of the rotating electrical machine is stopped.

In another embodiment, a first rotating electrical machine may be attached to a member that controls direction of a main controlled wheel of the vehicle, a second rotating electrical machine may be attached to a member that controls directions of sub-controlled wheel, and the first rotating electrical machine and the second rotating electrical machine may be controlled by the rotating electrical machine control device. In other words, in this embodiment, rotating electrical machine control device and the first rotating electrical machine are included in, for example, the electric power steering apparatus, and the rotating electrical machine control device and the second rotating electrical machine are included in, for example, the rear wheel steering apparatus. Also in this embodiment, the rotating electrical machine control device can reduce radio noise generated at a time when driving of the first rotating electrical machine and the second rotating electrical machine is stopped.

In another embodiment, the rotating electrical machine control device may control a rotating electrical machine for driving a wheel of a hybrid vehicle or a rotating electrical machine used as a driving source of other equipment that is not disposed in a vehicle. As described above, when the rotating electrical machine control devices according to the above-described embodiments are used for controlling a brushless motor as a rotating electrical machine driven by the PWM control, radio noise generated at a time when driving of the rotating electrical machine is stopped can be reduced.

While the present disclosure has been described with reference to the foregoing embodiments, it is to be understood that the disclosure is not limited to the embodiments and constructions. The present disclosure is intended to cover various modification and equivalent arrangements.

What is claimed is:

1. A rotating electrical machine control device for controlling a rotating electrical machine that has a winding group including a plurality of windings corresponding to a plurality of phases, comprising:
   a target current value calculation section that calculates target current values supplied to the respective windings;
   a pulse width modulation (PWM) signal generation section that generates PWM signals having pulse shape for the respective windings based on the target current values calculated by the target current value calculation section;
   a voltage application section that applies voltages to the respective windings based on the PWM signals generated by the PWM signal generation section; and
   a control section that controls the target current value calculation section, the PWM signal generation section, and the voltage application section to control driving of the rotating electrical machine,
   wherein when the control section stops the driving of the rotating electrical machine, the control section controls the PWM signal generation section to generate the PWM signals such that a timing of a pulse change in the PWM signal of at least one of the phases is different from timings of pulse changes in the PWM signals of the other phases by controlling the target current value calculation section to calculate the target current value supplied to at least one of the windings to be a predetermined value other than zero.

2. The rotating electrical machine control device according to claim 1, wherein when the control section stops the driving of the rotating electrical machine, the control section controls the PWM signal generation section to generate the PWM signals such that the timings of the pulse change in the PWM signal of each of the phases is different from the timings of the pulse changes in the PWM signals of the other phases.

3. The rotating electrical machine control device according to claim 1,
   wherein the timing of the pulse change is at least one of a timing of a rising edge of the PWM signal and a timing of a falling edge of the PWM signal.

4. The rotating electrical machine control device according to claim 1,
   wherein when the control section stops the driving of the rotating electrical machine, the control section controls the target current value calculation section to calculate all the target current values supplied to the respective windings to be predetermined values other than zero so that the PWM signal generation section generates the PWM signals such that the timing of the pulse change in the PWM signal of each of the phases is different from the timings of the pulse changes in the PWM signals of the other phases.

5. The rotating electrical machine control device according to claim 1,
wherein when the control section stops the driving of the rotating electrical machine, the control section controls the voltage application section to apply the voltages in such a manner that a timing of applying the voltage to the winding of at least one of the phases is different from timings of applying the voltages to the windings of the other phases.

6. The rotating electrical machine control device according to claim 5,
wherein when the control section stops the driving of the rotating electrical machine, the control section controls the voltage application section to apply the voltages in such a manner that the timing of applying the voltage to the winding of each of the phases is different from the timings of applying the voltages to the windings of the other phases.

7. A steering control system comprising:
the rotating electrical machine control device according to claim 1; and
the rotating electrical machine attached to a member that controls a direction of a steering wheel of a vehicle.

8. A steering control system comprising:
the rotating electrical machine control device according to claim 1; and
the rotating electrical machine attached to a member that controls a direction of a wheel of a vehicle that is different from a steering wheel.

9. A steering control system comprising:
the rotating electrical machine control device according to claim 1; and
the rotating electrical machine including a first rotating electrical machine and a second rotating electrical machine, the first rotating electrical machine being attached to a member that controls a direction of a steering wheel of a vehicle, and the second rotating electrical machine being attached to a member that controls a direction of a wheel that is different from the steering wheel.

* * * * *